United States Patent [19]

Dequasie

[11] 4,317,158
[45] Feb. 23, 1982

[54] AC CAPACITOR

[75] Inventor: Andrew Dequasie, Pownal, Vt.

[73] Assignee: Sprague Electric Company, North Adams, Mass.

[21] Appl. No.: 126,751

[22] Filed: Mar. 3, 1980

[51] Int. Cl.³ ............................................. H01G 1/13
[52] U.S. Cl. ............................... 361/272; 174/52 PE; 361/307
[58] Field of Search ............................... 361/272, 307; 174/52 PE

[56] References Cited

U.S. PATENT DOCUMENTS

| | | | |
|---|---|---|---|
| 2,706,742 | 4/1955 | Ehlers | 174/52 |
| 3,252,065 | 5/1966 | Warner | 361/272 X |
| 3,254,282 | 5/1966 | West | 174/52 PE X |
| 3,311,697 | 3/1967 | Quinn | 361/272 X |
| 3,652,333 | 3/1972 | Warren | 174/52 PE |
| 3,831,070 | 8/1974 | Bouille | 361/272 |
| 4,039,904 | 8/1977 | Klein | 174/52 PE X |

FOREIGN PATENT DOCUMENTS

| | | | |
|---|---|---|---|
| 2534232 | 2/1977 | Fed. Rep. of Germany | 361/272 |
| 853941 | 11/1960 | United Kingdom | 174/52 PE |
| 827955 | 2/1960 | United Kingdom . | |
| 2007432 | 5/1979 | United Kingdom . | |

Primary Examiner—Richard R. Kucia
Attorney, Agent, or Firm—Connolly and Hutz

[57] ABSTRACT

AC life and corona characteristics of a polypropylene-aluminum foil or a metallized film wound capacitor are improved by coating at least the ends of the capacitor with a partially cured urethane containing unreacted isocyanate groups.

13 Claims, 3 Drawing Figures

AC CAPACITOR

BACKGROUND OF THE INVENTION

This invention relates to an AC capacitor having improved AC life and corona characteristics, and more particularly to a dielectric film aluminum foil capacitor or a metallized film capacitor having at least the ends thereof coated with a urethane containing unreacted isocyanate groups.

Protective or potting layers have been used under hardenable resin encapsulants. For example, silicone elastomers have been used as protective coatings on dry capacitors under a hardenable resin encapsulant to prevent mechanical stress of the capacitor dielectric during the curing of the encapsulating resin. Likewise, electrical components have been potted in polyesters and ceramic capacitors in resilient elastomers to protect the units if the outer case cracks because of differential thermal expansion of the units and the encapsulating materials.

Film-foil or metallized film capacitors, when encapsulated in rigid insulating materials such as epoxies, may perform very well in DC applications and yet fail in a relatively short time in AC applications at equivalent voltage stress. Among the capacitors having plastic film dielectrics, e.g., polypropylene, polycarbonate and polyester, this problem is most obvious with polypropylene which is largely used in AC applications to take advantage of its very low dissipation factor.

SUMMARY OF THE INVENTION

It has been found that both AC life and corona characteristics of a wound dielectric film-aluminum foil or metallized film capacitor can be improved by coating at least the ends thereof with a urethane containing unreacted isocyanate groups prior to encasement of the unit, such as encapsulation in a hardenable resin, notably epoxy. Unlike the prior art coatings, only the ends of the unit need to be coated to achieve beneficial results.

It is not fully understood why coating the ends of the capacitor should prolong AC life and improve corona properties. Mechanical stresses that are set up in the unit and at the ends during the hardening of the encapsulant seem to affect life. However, not all flexible or soft coatings will prolong life as they should if just this type of stress were operating. The coatings that were effective in prolonging AC life of film-foil units were two amorphous polypropylene waxes, a depolymerized butyl rubber, a silicone resin, and a partially reacted urethane. The successful materials were notably stable in contact with the atmosphere although they are members of chemical families that are frequently sensitive to atmospheric contact. Only the urethane notably improved corona characteristics.

The urethane formulations typically consists of a diisocyanate prepolymer and curing agent such as a polyol which contains two or more hydroxyl groups per molecule. Further, it has been discovered that, among those urethane formulations which are beneficial, the benefit is enhanced if the curing agent content of the formulation is restricted so as to leave a portion of the original isocyanate content unreacted. The beneficial effect does not appear to depend greatly on the thickness of this partially cured urethane and, in convolutely wound film-foil capacitors, the effect can be obtained by coating only the extended foil ends, if desired, rather than coating the entire capacitor body, even if the entire capacitor body is subsequently encapsulated in a curable liquid epoxy.

Others have noted beneficial effects obtained by means of initial protective precoats such as those shown by Robert A. West in U.S. Pat. No. 3,254,282 which teaches the use of elastomeric precoats on dry electrolytic capacitors, and by Klein et al in U.S. Pat. No. 4,039,904 which teaches the use of various precoats to stabilize tantalum capacitors. However, none have noted the effects noted here with wound film-foil capacitors in which (1) the AC life enhancement is not obtained with all urethane prepolymers and (2) the beneficial effect is further enhanced if the final urethane formulation is such as to leve a portion of the isocyanate groups unreacted.

There appear to be two reasons for the beneficial effect of the unreacted isocyanate; (1) the corona start and extinguish voltages of film-foil capacitors are improved when the exposed foils are coated with partially-cured urethane as compared to fully-cured urethane or fully cured epoxy and (2) as taught in my co-pending application Ser. No. 101,618 filed Dec. 10, 1979 regarding the addition of isocyanates to liquid impregnants, all isocyanates are effective scavengers of many chemical species which may be harmful to capacitors, such as water, acids, alcohols, and amines.

It is not clear why all isocyanate prepolymers which cure to an elastomeric condition are not effective in this precoat application. The reason may lie in the initial isocyanate content or steric hinderance effects which could determine the effectiveness of the unreacted isocyanate or in the elasticity of the final cured material. Isocyanate prepolymers having initial isocyanate contents of 7% to 23% have been evaluated, and the better results generally were associated with the higher isocyanate content.

It has also been found that certain liquids can be beneficially added to the urethane formulation prior to application to the capacitor. Specifically, diisononyl phthalate (DINP) and diallyl phthalate (DAP) have been used in amounts ranging from 30% to 100% of the isocyanate prepolymer+polyol weight. These liquids behave as plasticizers, rendering the cured composition softer than it otherwise would be, but one of their chief advantages in this application is to reduce viscosity and extend pot life of the liquid mix. In terms of capacitor performance, the DINP has little or no effect while the DAP is usually associated with a slight improvement, possibly due to some scavenging effect of its unsaturate groups. The tendency to bleed some from the cured urenthane composition is also lower for DAP than for DINP.

Our preferred use of a diluent, when necessary, is 50 weight percent DAP. As diluent content is increased, the coating mixture will tend to penetrate into the capacitor windings and cause undesirable changes in dissipation factor and insulation resistance.

The maximum improvement of corona start and extinction voltages is usually obtained with about ½ of the isocyanate content left unreacted, that is, in a ratio of isocyanate groups to polyol hydroxyl groups of 1:0.5. However, a greater portion of the isocyanate, up to about ¾, can be left unreacted if this is necessary to prolong pot life.

It should also be noted as a practical matter that, although amine-cured epoxy formulations can be applied over thin urethane coats containing unreacted isocyanate with no particular difficulty, bubbles may become trapped in the epoxy layer if a significant mass of partially-cured urethane underlies the epoxy. This may be due to the amine absorbing water or carbon dioxide that then is released or reacts during curing. It can be prevented by applying a fully cured urethane over the partially cured urethane either as a final coat or as a barrier coat against the epoxy curing agent, or by using a fast-curing amine. This bubble-producing effect is most likely to occur when the amine curing agent in the epoxy is of a sort that reacts slowly or "B-stages" with the epoxy.

The foregoing considerations apply also to the use of partially reacted isocyanate formulations used as potting compounds and as end seals of cylindrical capacitors having a body wrapping of a material such as adhesive tape. When the capacitor involved is of the type having electrodes of aluminum deposited from the vapor phase under vacuum (aluminum metallized), the beneficial effect of the urethane precoat or encapsulant is best seen in the reduction of capacitance loss (due to electrode erosion) during life test on AC voltages.

DESCRIPTION OF THE PREFERRED EMBODIMENTS

Figure 1:
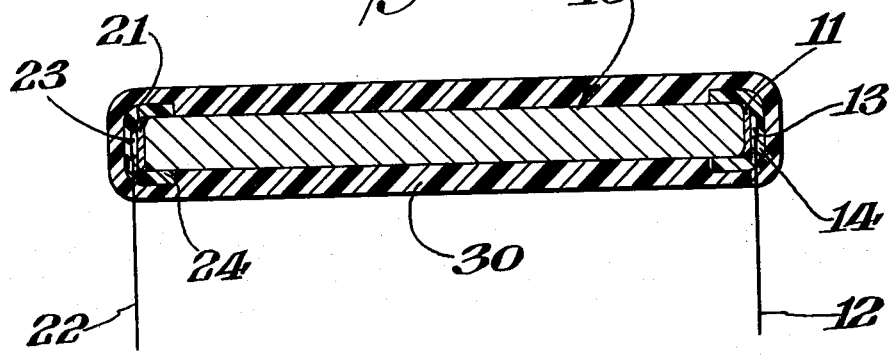
FIG. 1 is a cross-sectional view of a fully encapsulated rolled capacitor bearing the precoat of the present invention.

FIG. 1 shows a rolled polypropylene film-aluminum foil capacitor 10 section which has metallic spray or solder on both ends 11 and 21 to which leads 12 and 22 are attached at 13 and 23, preferably by welding. At least the ends of the capacitor have a precoat 14 and 24 over the lead attachments 13 and 23. The resulting assembly is surrounded by an encapsulating layer 30. In FIG. 1, the leads are shown as radial leads; axial leads may be used also. Likewise, although only the ends need to receive precoat 14 and 24, the manufacturing sequence may make it more feasible to coat the entire unit.

Figure 2:
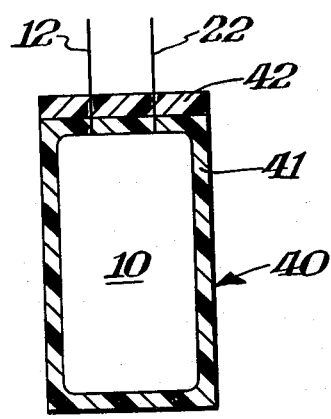
FIG. 2 is a cross-sectional view of a rolled capacitor in a can and fully coated by the precoat of the present invention.

FIG. 2 is a cross-sectional view of another embodiment in which a larger wound AC section has been encased in a phenolic can 40, although other cans may be used. The urethane precoat material 41 is used to fill the space (exaggerated in the drawing) between capacitor section 10 and can 40 and covers the upper end of section 10. A conventional epoxy sealant 42 is used to seal the unit.

Figure 3:
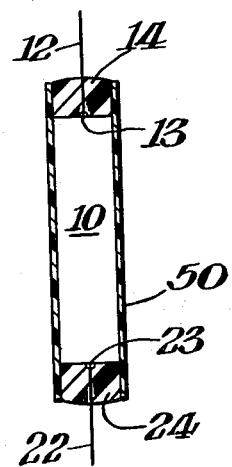
FIG. 3 is a cross-sectional view of a rolled capacitor enwrapped in a tape and end-coated with the precoat of the present invention.

FIG. 3 is a cross-sectional view of a different embodiment in which a wound capacitor section 10 has been wrapped in a tape 50 that is wider than the length of the capacitor section providing tube-walled spaces filled with the urethane precoat 14 and 24. If extra rigidity is required, an outer tube (not shown) may be placed over the unit.

While the preferred foil is aluminum, alloy foils known in the art may be used. Similarly, the preferred metallization is aluminum but others known in the art such as a zinc metallization may be used. The preferred film is polypropylene, but Mylar or polycarbonate dielectric films may be used.

EXAMPLE 1

In seeking to improve corona start and extinction voltages of convolutely wound polypropylene-foil capacitors encapsulated with a thixotropic epoxy dip coat, precoats were applied to the foil ends only. The test groups were as follows:

(A) No precoat (control group); (B) Urethane composed of ricinoleate-modified diphenyl methane diisocyanate cured with approximately one half the stoichiometric amount of polyol; (C) Conductive epoxy, silver-loaded; (D) Clear bisphenol A epoxy cured with an approximately stoichiometric amount of a methylene dianiline isomer mixture; (E) Urethane composed of a toluene diisocyanate prepolymer cured with an approximately stoichiometric amount of butane diol. All groups were overcoated with the same thixotropic epoxy dip. Average corona start/extinction voltages obtained for each group are listed below and indicate that test group B is superior.

| Dielectric | A | B | C | D | E |
| --- | --- | --- | --- | --- | --- |
| 1.5 mil polypropylene | 387/356 | 454/423 | 370/318 | 390/365 | 377/345 |
| 2.0 mil polypropylene | 420/359 | 484/433 | 404/379 | 438/400 | 399/353 |

EXAMPLE 2

The successful coating of Example 1 was then applied to additional film-foil test capacitors (1) as a full body precoat and (2) as a foil end coat only. These were then thixotropic epoxy dip coated and compared to epoxy-coated control units having no precoat. Average corona start/extinction voltages confirmed the beneficial effect of the pre-coat in either mode of application in two of the three capacitor designs used. Precoats were as follows: (A) None (control group); (B1) Ends only precoated with urethane composed of ricinoleate-modified diphenyl urethane diisocyanate cured with approximately one half the stoichiometric amount of polyol; (B2) Entire body precoated with same urethane as used with B1.

| Dielectric | A | B1 | B2 |
| --- | --- | --- | --- |
| 1.0 mil Polypropylene | 336/321 | 409/389 | 428/410 |
| 1.5 mil Polypropylene | 418/400 | 418/388 | 413/395 |
| 2.0 mil Polypropylene | 423/391 | 525/486 | 515/478 |

EXAMPLE 3

In order to check the effect of polyol ratio on corona voltages of urethane-precoated film-foil capacitors, four similar commercial two-part urethane formulations were used as precoats on film-foil capacitors having a b 'mil polypropylene dielectric. Each of the four urethanes was used with the manufacturer's recommended polyol ratio (assumed to be stoichiometric) and also at a lower polyol ratio equal to 50 weight percent of the isocyanate prepolymer. Average corona start/extinction voltages after applying a thixotropic epoxy coat over the precoated units confirmed the benefit of the reduced polyol use. Prepolymers A and B are both ricinoleate-modified diphenyl methane diisocyanate prepolymers.

| Normal Urethane Formulation | Normal Precoat | Precoat with 50% Polyol |
|---|---|---|
| (100 parts Prepolymer A + 108 Polyol 1) | 458/408 | 500/450 |
| (100 parts Prepolymer A + 127 Polyol 2) | 450/400 | 556/506 |
| (100 parts Prepolymer B + 127 Polyol 3) | 417/350 | 500/450 |
| (100 parts Prepolymer B + 82 Polyol 4) | 475/425 | 495/445 |

EXAMPLE 4

Capacitors from two lots, one having a nominal capacitance of 0.47 μfd and the other having a nominal capacitance of 0.28 μfd, and both wound with aluminum foil and 0.5 mil polypropylene film, were divided into 3-piece groups, dipped in various urethane precoats, then all were finish coated with two layers of an amine-cured epoxy dip coat. The average corona start-/extinction voltages and hours to failure when tested at 250 V, 60 Hz, and 80° C. is given below. Precoat material identity is as follows: U is a ricinoleate-modified diphenyl methane diisocyanate prepolymer with polyol added equal to one-half the amount needed to react with all of the isocyanate. DINP is diisononyl phthalate. DAP is diallyl phthalate. COS is a fumed silica thixotrope used to control viscosity. 100 DINP means that an amount of DINP equal to 100% of the urethane (isocyanate+polyol) was used.

| | .47 μfd | | | .28 μfd | | |
|---|---|---|---|---|---|---|
| Precoat Mixture | Corona S/E | Failure time, Hours | % Passing 1005 hr. | Corona S/E | Failure time, Hours | % Passing 1005 hr. |
| No precoat | 333/283 | 40.8,40.8,40.8 | 0 | 350/283 | 40.8,40.8,137 | 0 |
| U | 450/400 | 678.1 | 67 | 437/383 | 524.7 | 67 |
| U + 50 DINP | 417/367 | 249.1 | 67 | 417/367 | 627 | 67 |
| U + 100 DINP + 4COS | 467/417 | 524.7 | 67 | 450/400 | None | 100 |
| U + 50 DINP + 4COS | 450/400 | 524.7,627 | 50 | 433/383 | None | 100 |
| U + 50 DAP | 433/383 | None | 100 | 417/367 | None | 100 |
| U +0 50 DAP + 4COS | 450/400 | 660.4,1050,1050 | 67 | 450/400 | 1050,1050 | 100 |
| U + 100 DAP + 3.3COS | 450/350 | None | 100 | 450/383 | None | 100 |
| U + 50 DAP + 4COS | 450/400 | 1050 | 100 | 450/400 | None | 100 |

EXAMPLE 5

Capacitors from one lot, having a nominal capacitance of 5 μF and wound with aluminum-metallized 0.32 mil polypropylene film, were wrapped in adhesive-backed polyester tape having a width greater than the capacitor length so as to leave a tape-walled space at each end to be filled with a curable resin end seal. These units were divided into three groups of 8 pieces each and end-sealed as shown below, then life-tested at 500 volts, 60 Hz, and 80° C. Capacitance loss due to this life test is least where a partially cured urethane is used (group B), second best where a fully cured urethane is used (group C), and worst where a conventional amine-cured epoxy is in direct contact with the capacitor (group A). The urethane used was a ricinoleate-modified diphenyl methane diisocyanate prepolymer with polyol added in an amount to react with all of the diisocyanate (fully cured) or in an amount to react with one-half of the diisocyanate (partially cured). The pre-coated units were capped with the amine-cured epoxy.

| Group | | Capacitance Loss on Life Test, Percent | |
|---|---|---|---|
| | | at 242 Hours | at 549 hours |
| A | High | 4.53 | 8.33 |
| | Low | 2.77 | 3.70 |
| | Average | 3.42 | 6.56 |
| B | High | 2.63 | 5.38 |
| | Low | 1.66 | 3.71 |
| | Average | 1.99 | 4.27 |
| C | High | 2.65 | 6.33 |
| | Low | 1.95 | 3.70 |
| | Average | 2.17 | 4.77 |

EXAMPLE 6

Capacitors from one lot, having a nominal capacitance of 5 μF and wound with aluminum-metallized 0.32 mil polypropylene film were assembled in phenolic cases having one end closed. The free space between the section and case was filled with various resins to a point about ⅛" above the top of the capacitor, then all units were capped with an amine-cured epoxy. These units were life tested at 500 volts, 60 Hz, and 80° C. The capacitance loss after 288 hours on test is shown below in order of magnitude for single pieces, showing the generally favorable effect of partially cured urethane fill as compared to conventional amine-cured epoxy fill.

In the Table below 50% Polyol and 100% Polyol refer to the percentage of stoichiometric requirement for the polyol curing agent, and 50% DAP refers to an addition of diallyl phthalate equal to 50% of the weight of isocyanate plus polyol. Isocyanate 1 is a rincinoleate-modified diphenyl methane diisocyanate prepolymer containing about 21% free isocyanate. Isocyanate 2 is a polyol-modified diphenyl methane diisocyanate prepolymer containing about 8% free isocyanate. The castor oil is a commercial water-free grade of urethane curing agent. The polyol is also a commercial urethane-grade curing agent.

| % Capacitance Loss | Fill Resin |
|---|---|
| 1.64 | Isocyanate 1 + 50% Castor oil |
| 1.80 | Isocyanate 2 + 50% Polyol |
| 2.02 | Isocyanate 1 + 50% Castor oil |
| 2.26 | Isocyanate 2 + 100% Polyol |
| 2.54 | Isocyanate 1 + 50% Polyol + 50% DAP |
| 2.58 | Isocyanate 2 + 50% Polyol + 50% DAP |
| 2.65 | Isocyanate 1 + 50% Polyol |
| 2.71 | Isocyanate 2 + 50% Polyol |
| 2.73 | Isocyanate 1 + 50% Castor oil |
| 2.80 | Amine-cured Epoxy |
| 2.90 | Isocyanate 2 + 100% Polyol |
| 3.19 | Isocyanate 2 + 50% Polyol + 50% DAP |
| 3.65 | Amine-cured Epoxy |

What is claimed is:

1. An AC capacitor comprising a convolutely wound capacitor section of electrodes separated by dielectric films, lead attachments to said electrodes extending from at least one end of said section, a coating over at least both ends of said section and said lead attachments, and an outer protective casing over said section, said coating being partially cured urethane with about 50% to about 75% unreacted isocyanate groups to improve both AC life and corona properties of said capacitor.

2. An AC capacitor as in claim 1 wherein said dielectric film is polypropylene and at least one of said electrodes is aluminum.

3. An AC capacitor as in claim 2 wherein at least one of said electrodes is a metallized coating on one of said polypropylene films.

4. An AC capacitor as in claim 2 wherein said casing is a rigid tube, and said coating fills the ends of said tube.

5. An AC capacitor as in claim 2 wherein said casing is a can with one end closed and said coating covers all of said section.

6. An AC capacitor as in claim 2 wherein at least one of said electrodes is a foil electrode.

7. An AC capacitor as in claim 2 wherein said casing is a hardened encapsulating material.

8. An AC capacitor as in claim 1 wherein said coating is a rincinoleate urethane prepolymer partially cured with a rincinoleate polyol curing agent.

9. An AC capacitor as in claim 8 wherein the ratio of prepolymer isocyanate groups to polyol hydroxyl groups is 1:0.5.

10. An AC capacitor as in claim 1 wherein said coating contains a diluent.

11. An AC capacitor as in claim 10 wherein said diluent is selected from diisononylphthalate or diallylphthalate.

12. An AC capacitor as in claim 11 wherein said diluent is diallylphthalate.

13. An AC capacitor as in claim 12 wherein per 100 parts of said urethane, 50 parts of said polyol and 150 parts of said diallylphthalate are used.

* * * * *